United States Patent
Coleman et al.

(10) Patent No.: US 6,319,085 B1
(45) Date of Patent: Nov. 20, 2001

(54) ROCKET POP

(76) Inventors: Thomas J. Coleman, 19170 Paddock Pl., Abingdon, VA (US) 24211; William K. Schlotter, IV, 117 Wateredge La., Fredericksburg, VA (US) 22406; Princess Ann Coleman, 19170 Paddock Pl., Abingdon, VA (US) 24211; Ann M. Schlotter, 117 Wateredge La., Fredericksburg, VA (US) 22406

( * ) Notice: Subject to any disclaimer, the term of this patent is extended or adjusted under 35 U.S.C. 154(b) by 0 days.

(21) Appl. No.: 09/503,338

(22) Filed: Feb. 14, 2000

(51) Int. Cl.[7] .................................................. A63H 33/00
(52) U.S. Cl. ............................. 446/71; 496/71; 426/135
(58) Field of Search .................................. 426/134, 135, 426/132; 446/71, 231, 75, 76; 30/130, 115

(56) References Cited

U.S. PATENT DOCUMENTS

| | | | |
|---|---|---|---|
| D. 416,371 | * 11/1999 | Mehdikhan | 446/134 |
| 4,352,242 | * 10/1982 | Plet | 30/130 |
| 4,717,365 | * 1/1988 | Andersen et al. | 446/231 |
| 5,919,079 | * 7/1999 | Coleman et al. | 446/134 |
| 5,976,590 | * 11/1999 | Coleman et al. | 426/134 |

* cited by examiner

*Primary Examiner*—Sam Rimell
(74) *Attorney, Agent, or Firm*—Melvin L. Crane Agent

(57) ABSTRACT

A candy holder-toy that includes a housing which contains a piece of rigid candy therein. A push rod passes into the housing for forcing the piece of candy from the housing for consumption. The housing can be formed as a rocket ship having fins which make the rocket ship appear more realistic.

18 Claims, 1 Drawing Sheet

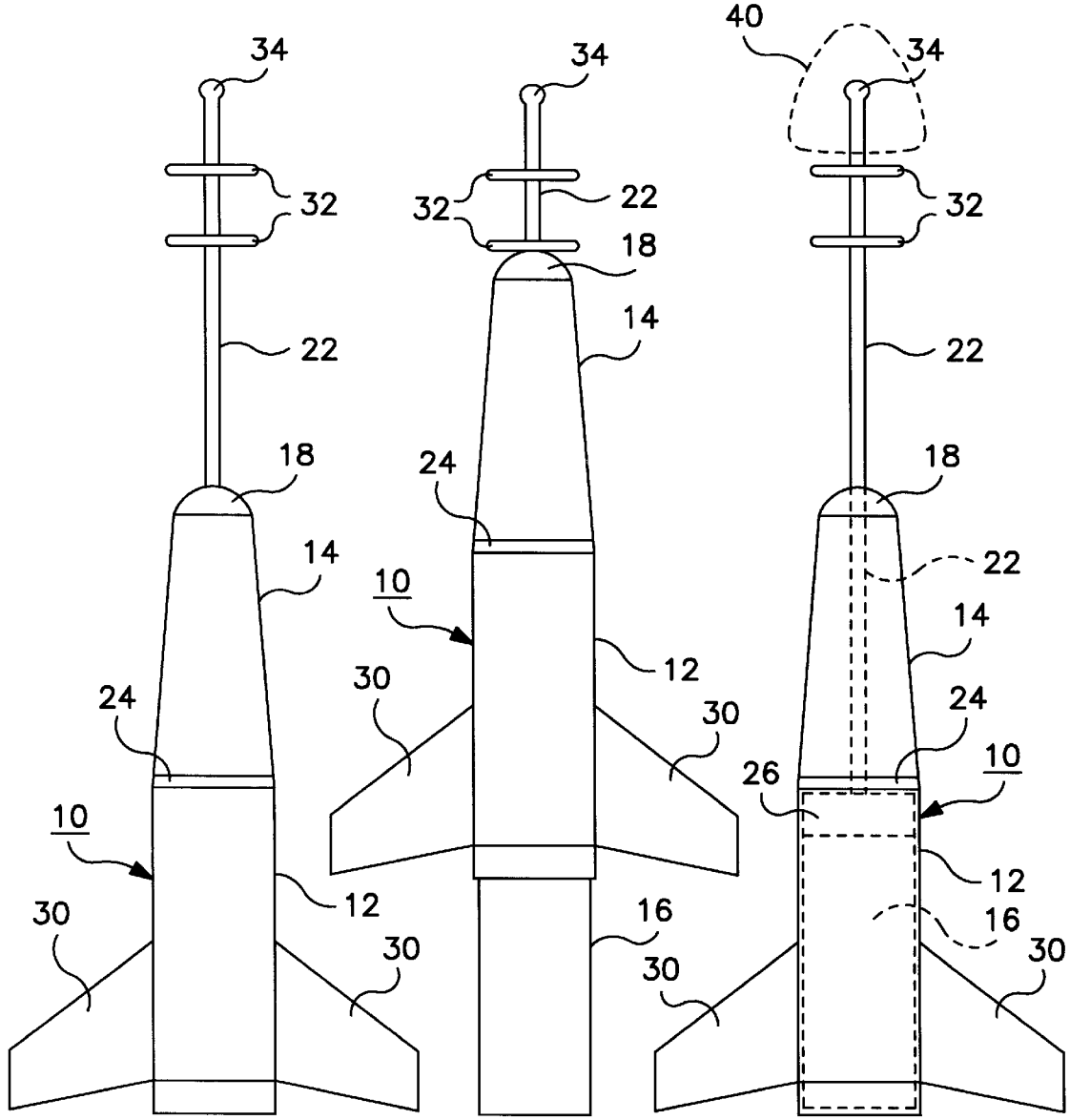

ROCKET POP

This invention is directed to a rocket pop which stores and presents a piece of hard candy for consumption by a consumer.

BACKGROUND OF THE INVENTION

Heretofore various devices have been used by which a piece of candy is secured in place for consumption by a person.

Toy rocket ships have been provided by which a person can be amused or by which one can enjoy the pleasure of a toy similar to a toy rocket ship. Such a rocket ship has been set forth in U.S. Pat. No. 4,717,365.

OBJECTS OF THE INVENTION

It is therefore an object of the invention to provide a toy rocket ship which can be used for storing and presenting a piece of candy for consumption by a consumer.

Another object is to provide a toy rocket ship which can be used as a toy for amusement during storage of a piece of candy for consumption.

Still another object is to provide a toy rocket ship which can be used as a toy for pleasure after a piece of candy has been consumed.

Other objects and advantages will become obvious to those skilled in the art upon a review of the drawings, specification and claims.

BRIEF DESCRIPTION OF THE DRAWINGS

FIG. 1 illustrates a side view of a toy rocket ship which contains a push rod for dispensing a piece of candy;

FIG. 2 illustrates a toy rocket ship as shown in FIG. 1 in which a piece of candy has been pushed from the toy rocket ship by the push rod; and FIG. 3 illustrates a side view as shown in FIG. 1 which illustrates the candy and push rod within the housing as shown by dotted lines.

DETAILED DESCRIPTION

Now referring to the drawings where like reference characters refer to like parts through the different views, FIG. 1 illustrates a side view of a toy rocket ship which includes a housing 10 made of plastic or any other desired material. The housing is formed by a cylindrical section 12 in which a piece of rigid candy 16 is stored for consumption. A front section of the housing 14 is conical shape and the upper end of the conical section includes a rod support 18 for a push rod 22 which is shown extending from the housing. The push rod 22 extends through the conical shaped housing and passes through a second rod support 24 at a juncture of the cylindrical and conical-shaped housing. The bottom end of the push rod has a candy-base support 26 secured thereon with the candy-base support 26 in the cylindrical section of the housing and below the second rod support 24 so that the candy-base support can be pushed through the cylindrical section of the housing. The piece of rigid candy 16 is secured at one end to the candy-base support so that the candy can be moved into and out of the cylindrical section of the housing. The housing is shown with protruding fins 30 which are provided to make the device appear more like a toy rocket. The housing can be decorated with any desired decoration and can have additional appendages, if desired. The push rod is shown with spaced discs 32 which are for decoration of the push rod and which prevents the push rod from being pushed entirely into the housing. The lowermost disc must be positioned on the push rod at a position which permits the push rod to push the piece of candy entirely from the lower housing section. The upper end 34 of the push rod can be enlarged so that without the disc the push rod cannot be pushed through the upper push rod support or guide 18.

In carrying out the invention, the housing is formed with conical and cylindrical sections 14, 12 with the upper and lower push rod supports 18 and 24. The push rod is inserted into the upper push rod support and passed through the second push rod support and on to the lower end of the cylindrical housing. The candy base support 26 is secured to the end of the push rod and a piece of candy 16 is secured to the candy base support. The push rod is then pulled upwardly until the candy-base support contacts the second push-rod support 24. The disc 32 can be added to the push rod before loading the candy or after the candy has been loaded. Once the candy has been loaded onto the candy-base support and drawn into the housing by the push rod, the lower end of the housing can be closed by a suitable piece of plastic, paper, or any other part which serves as a closure. The closure can be of a type such as one which will break away when the push rod is forced into the housing in order to expose at least a portion of the candy.

A candy pop 40 shown in dotted lines could be added to the upper end of the push rod so that there would be two pieces of candy for consumption. The pop 40 should be covered for sanitary purposes.

Obviously the housing and exposed parts should be made without any sharp edges or parts and should be made safe for use by small children.

The foregoing relates to preferred exemplary embodiments of the invention, it being understood that other variants and embodiments thereof are possible within the spirit and scope of the invention, the latter being defined by the appended claims.

We claim:

1. A candy holder-toy which comprises a housing, said housing includes a conical section and a cylindrical section, a push rod that extends into said housing, a first support means formed on an upper end of said conical section for supporting and guiding said push rod, and a second support means within said cylindrical housing section for supporting and guiding said push rod, means for securing one end of a piece of candy onto one end of said push rod for storage of the piece of candy within the housing, said push rod has a length such that said piece of candy can be pushed from said housing for consumption, and said means for securing said piece of candy to one end of said push rod is cylindrical and contained within said cylindrical housing section.

2. A candy holder-toy as set forth in claim 1, in which an upper end portion of said push rod has at least one disc secured thereto.

3. A candy holder-toy as set forth in claim 1, in which said housing includes fins that protrude from said housing.

4. A candy holder-toy as set forth in claim 2, in which said housing includes fins that protrude from said housing.

5. A candy holder-toy as set forth in claim 1, which includes means to enclose an open end of said cylindrical housing section.

6. A candy holder-toy as set forth in claim 2, which includes means to enclose an open end of said cylindrical housing section.

7. A candy holder-toy as set forth in claim 1, in which said push rod includes a candy pop secured on an upper end.

8. A candy holder-toy as set forth in claim 2, in which said push rod includes a candy pop secured on an upper end.

9. A candy holder-toy as set forth in claim 3, in which said push rod includes a candy pop secured on an upper end.

10. A candy holder-toy as set forth in claim 4, in which said push rod includes a candy pop secured on an upper end.

11. A candy holder-toy as set forth in claim 5, in which said push rod includes a candy pop secured on an upper end.

12. A candy holder-toy as set forth in claim 6, in which said push rod includes a candy pop secured on an upper end.

13. A candy holder-toy as set forth in claim 7, in which said candy pop has a protective covering thereon.

14. A candy holder-toy as set forth in claim 8, in which said candy pop has a protective covering thereon.

15. A candy holder-toy as set forth in claim 9, in which said candy pop has a protective covering thereon.

16. A candy holder-toy as set forth in claim 10, in which said candy pop has a protective covering thereon.

17. A candy holder-toy as set forth in claim 11, in which said candy pop has a protective covering thereon.

18. A candy holder-toy as set forth in claim 12, in which said candy pop has a protective covering thereon.

* * * * *